Nov. 29, 1938.                H. MULCH                    2,138,068
                FILM OPERATING MECHANISM FOR CAMERAS
                    Filed Nov. 17, 1936      2 Sheets-Sheet 1
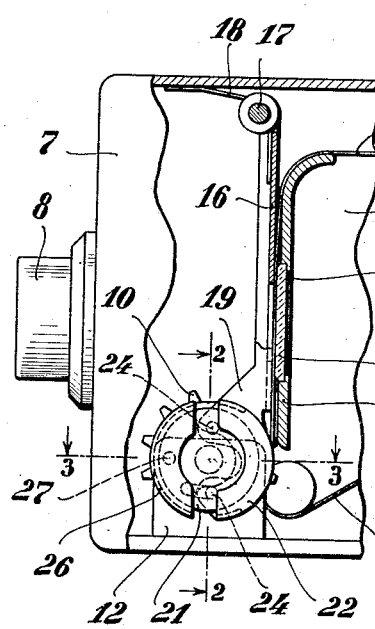
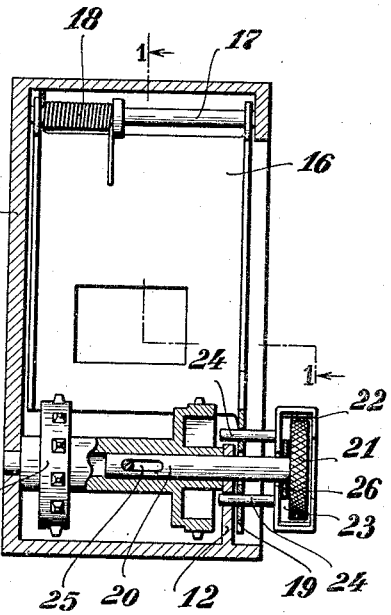
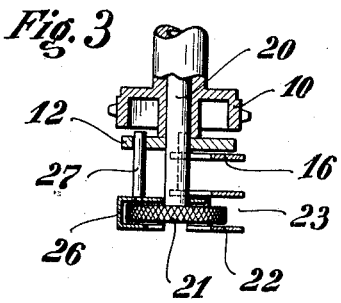
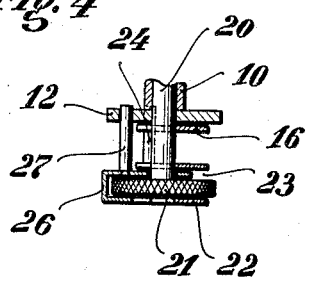
INVENTOR
*Hans Mulch*
BY
*Ivan E. A. Konigsberg*
ATTORNEY

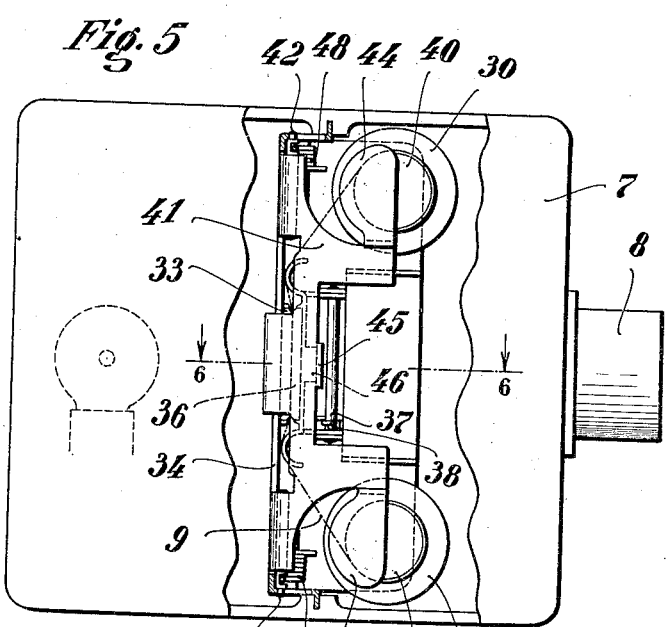
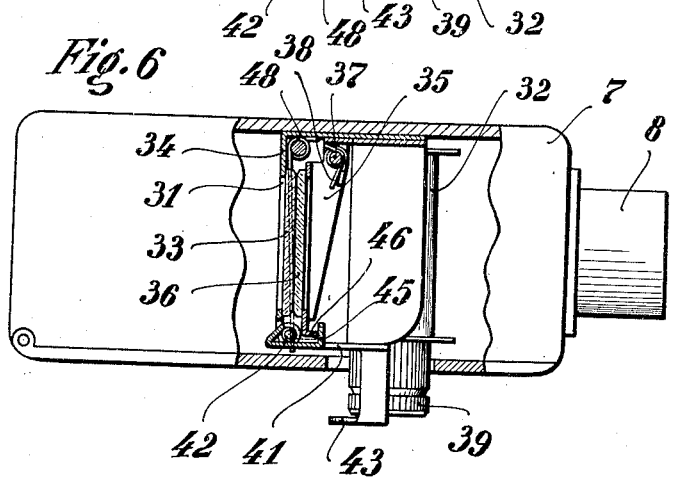

Patented Nov. 29, 1938

2,138,068

UNITED STATES PATENT OFFICE 2,138,068

FILM OPERATING MECHANISM FOR CAMERAS

Hans Mulch, Wetzlar-Niedergirmes, Germany, assignor to Ernst Leitz, G. m. b. H., Wetzlar, Germany Application November 17, 1936, Serial No. 111,198
In Germany November 23, 1935

4 Claims. (Cl. 95—31)

This invention relates to improvements in the film operating mechanism of cameras which use a motion picture film for the taking of pictures. In such cameras the film is held firmly between two members in photographing position behind the objective. When a picture has been taken, the film is released and moved forward the length of a picture so as to be ready for the taking of the next picture. If the operator rotates the film conveying rollers before releasing the film the latter may be scratched, even the film perforations may be torn. In order to prevent such occurrences, means have been provided which require that the operator must operate some other element first before he can move the film. Such arrangements suffer from the disadvantage that the operator may forget to operate the prior element in which case of course the film may be spoiled anyway. To overcome this an arrangement has been proposed in which the shaft of the film conveying roller is uncoupled from the roller while a picture is being taken so that before the conveying roller can be operated to move the film, the shaft must be coupled to the roller and this coupling movement is used to automatically release the film. Such arrangements are expensive and cannot be used in simple or inexpensive cameras.

The object of this invention is to provide a simple inexpensive mechanism in which, when the operator takes hold of a rotatable knob in order to rotate the film conveying roller, he automatically and necessarily must actuate a member which serves to release the film. Preferably the invention is embodied in a mechanism in which one of the film holding members is operatively connected to a handle or other member which in turn normally prevents or obstructs the operation of the film moving roller, said obstructing member being necessarily operated, hence the film is released, before it can be moved.

Accordingly the invention is embodied in film operating mechanisms arranged and constructed as hereinafter described and as illustrated in the accompanying drawings in which Fig. 1 is a view of the film operating mechanism with parts in section and parts broken away.

Fig. 2 is a view partly in section and with parts removed looking in the direction of arrow 2 in Figure 1.

Fig. 3 is a sectional view of parts of the mechanism taken substantially on the line 3—3 of Figure 2.

Fig. 4 is a similar view illustrating the operation of the device.

Fig. 5 is a view partly in elevation and partly in section showing another arrangement.

Fig. 6 is a plan view of a camera with parts in section on the line 6—6 in Fig. 5 showing details of the film releasing mechanism.

Referring to Figures 1–4, the numeral 7 indicates a camera having an objective 8. The pictures are taken on a motion picture film 9 having the usual perforations at the edges, not shown. The film is moved stepwise in Figure 1 by a film conveying roller 10 of usual construction and which is supported at one end in the wall 11 of the camera, the other end of the roller being supported in a small upright bracket 12. The film is as usual unwound from a film spool and wound up upon another film spool. These spools are not shown in Figure 1, but are shown in Figure 5 as will be described later. Between the film spools the film passes behind and past a film window in line with the objective where it is held between two members while the picture is being taken.

In Figures 1 and 2 the film passes over a glass plate 13 in the film window 14 in the fixed film holding member 15. The film is held against the glass plate by a film plate 16 which is swingably supported at the top on a shaft 17 which supports a spring 18 which presses the plate 16 against the glass plate 13. The plate 16 has side flanges as shown and one of these flanges extends below the plate and is enlarged to form a flat support 19. The shaft 20 of the conveying roller 10 extends through the plate support 19 and carries an operating wheel 21.

The support 19, i. e. the movable film pressure plate, carries a semi-circular cap or cover 22 which covers one half of the wheel 21 in such a manner that the latter cannot be seized by the operator in trying to rotate the wheel. The cover has a semi-circular slot 23 through which the wheel 21 will project when the cover is moved to the left in Figure 1 and as shown in Figure 4. The cap 22 may be secured in fixed relation to the flange support 19 or as shown in the drawings; the connection may be slidable in that the cap 22 may have two pins 24 extending through the flange support 19. The shaft 20 may be slidably connected to the roller 10 by a pin and slot connection as at 25. As shown in Figure 2 the shaft 20 with the wheel 21 and the cap 22 may be pulled outward, yet the wheel and the roller 10 are operatively connected. Or the shaft may be pushed inward with the capped wheel for the purpose of packing and shipping, the package then being flatter. The lefthand side of the wheel 21 is covered by another semi-circular cap 26 having a pin 27 by means of which it may also be slidably operated the same as the cap 22.

The operation is as follows. With parts in the positions shown in Figures 1–3 it is obvious that the operator cannot seize the wheel 21 for rotation because the right hand edge of the wheel is within the cap 22. It will also be obvious that when the operator desires to rotate the conveying roller 10 and the wheel 21, he will grip the latter between his thumb and forefinger and in doing so he will inevitably and automatically move the cap 22 towards the cap 26, thereby gripping the wheel on the right side thereof and thus be able to rotate it, that being the normal natural way of taking hold of the wheel. When however, the cap 22 is moved to the left in Figure 3 it follows that the pins 24 also move the flange support 19, hence swings the pressure plate 16 away from the film support 15 and the film is released.

In actual practice the operation of releasing the film and rotating the roller 10 clockwise occurs as one single action without requiring any special thought or attention from the operator with respect to releasing the film before turning the wheel. He simply cannot help doing it.

Figures 5 and 6 illustrate a different embodiment of the invention in which the film 9 is operated between spools 30 and 32 past the film window 31. The film window has a glass plate 33 in the fixed film holding member 34. The movable film holding member is marked 35 and carries another glass plate 36. The movable member is pivoted at 37. A spring 38 tends to move the member 35 with glass plate 36 away from the fixed member 34 and glass plate 33. The film spools have operating wheels 39 and 40.

In order to prevent operation of either of the spools 30 and 32 without first releasing the film, an obstruction member 41 is provided in the form of a vertically disposed plate. The plate is pivoted at 42, 42 and is formed with two thumb pieces 43 and 44 which are bent in front of the wheels 39 and 40 as shown. The plate has an angular catch 45 adapted to engage the edge 46 of the movable film holding member. Springs 48, 48 tend to hold the plate 41 in closed position with the catch 45 pressing against the edge 46.

The operation is as follows. First the film 9 is wound upon the supply spool 30 and the free end attached to the winding up spool 32, the spools being detached from the camera. Then the film window is opened by moving the plate 41 clockwise to the right in Figure 6, the catch 45 moving away from the edge of the movable film holding member 35, and the spring 38 swings the latter on the pivot 37 away from the fixed glass plate 33. The spools are now placed in position and the film passed between the glass plates.

The film is now ready to be used and the parts are in the positions shown in Figures 5 and 6. The film is held between the two glass plates by pressure of the springs 48 acting against the plate 41 and the catch 45 of the plate is in engagement with the movable film pressure member 35. The thumb pieces 43 and 44 prevent the operator from gripping the wheels without gripping the thumb pieces. When a picture has been taken, the operator grips the thumb piece 43 and wheel 39 between the thumb and forefinger and then rotates the spool 32 thereby also causing the automatic release of the film because the thumb piece and plate 41 have now been moved towards the right in Figure 5. The grip upon the thumb piece and the wheel is a natural normal way of taking hold of the wheel in order to rotate it to wind up the film. The glass plates being seperated while the film is advanced one picture eliminates scratching or tearing of the film.

The foregoing is believed to fully disclose the invention, the chief feature of which is automatic release of the film before it is advanced for taking the next picture. The automatic release is caused by the operator involuntarily and without any effort whatever taking hold of an element which in turn automatically actuates the movable film holding member. Of course the principles of the invention may be applied to mechanisms other than cameras. It will also be noted that in Figure 1 the film conveying roller wheel is covered to such an extent by the two caps that it is practically impossible to operate the same without first moving one of the caps, whereas in Figure 5 one half of the wheel is uncovered and might be rotated with one finger. The construction is alternative. For instance, the cap 26 in Figure 1 might be omitted and on the other hand such a cap might be added for the wheels in Figure 5. Either construction embodies the inventive thought of automatic release of the film together with the advancing of the film.

It will also be noted that the construction is not limited to advancing only successive lengths of film of the same lengths. If it is desired for any reason to advance a length of film different from the preceding lengths, such an operation is possible. When the film is released, the film roller may be rotated to any desired extent. It will also be noted that the invention may be used in connection with a projection apparatus which is indicated by the lamp shown in dotted line in Figure 5.

I claim:

1. A film operating mechanism for cameras comprising a fixed and a movable member for holding the film between them during exposures of the film, a roller for moving the film between exposures thereof, a wheel for actuating the roller, a capping device connected to the movable member to move the same to release the film, said capping device enclosing the said wheel to prevent normal operation thereof before the film has been released.

2. A film operating mechanism for cameras comprising a fixed and a movable member for holding the film between them during exposures of the film, a roller for moving the film between exposures thereof, a wheel for actuating the roller, a capping device connected to the movable member to move the same to release the film, said capping device enclosing the said wheel to prevent normal operation thereof before the film has been released and a spring for restoring the movable member to film holding position after the film has been moved by said roller.

3. A film operating mechanism for cameras comprising a fixed and a movable member for holding the film between them during exposures of the film, a roller for moving the film between exposures thereof, a wheel for actuating the roller, a capping device connected to the movable member to move the same to release the film, said capping device enclosing the said wheel to prevent normal operation thereof before the film has been released and means for supporting the said wheel and capping device in slidable relation to the said mechanism.

4. A film operating mechanism for cameras including a fixed and a movable plate for holding the film between them during exposures, a roller for advancing the film between exposures, a manually operated wheel for actuating the roller, means preventing manual operation of the wheel without automatic release of the film from said movable film holding member, said means consisting of a member connected to the movable plate and extending into the path of normal manual seizure of the wheel.

HANS MULCH.